United States Patent [19]

Moosberg

[11] 4,003,270  
[45] Jan. 18, 1977

[54] COUPLING MECHANISM WITH MEANS FOR DISENGAGEMENT AND FOR AUTOMATIC ENGAGEMENT OF THE SPOOL IN SPINNING REELS

[75] Inventor: Börje Sigurd Moosberg, Morrum, Sweden

[73] Assignee: ABU Aktiebolag, Svangsta, Sweden

[22] Filed: Oct. 20, 1975

[21] Appl. No.: 623,991

[30] Foreign Application Priority Data

Oct. 21, 1974 Sweden .......................... 7413210

[52] U.S. Cl. .............................. 74/405; 242/84.1 R; 242/211

[51] Int. Cl.² .................. F16H 57/00; A01K 89/00

[58] Field of Search ................. 74/405; 242/84.1 R, 242/84.1 K, 211, 219

[56] References Cited

UNITED STATES PATENTS

| 2,673,043 | 3/1954 | Verbeke | 242/211 X |
|---|---|---|---|
| 3,104,850 | 9/1963 | Wood | 74/405 X |
| 3,612,425 | 10/1971 | Shakespeare et al. | 242/84.1 R |
| 3,618,896 | 11/1971 | Bewley | 74/405 X |
| 3,916,715 | 11/1975 | Covey | 242/84.1 R X |

Primary Examiner—Leonard H. Gerin  
Attorney, Agent, or Firm—Karl W. Flocks

[57] ABSTRACT

This invention relates to a coupling mechanism with means for disengagement and automatic reengagement of the spool in a spinning reel. The coupling mechanism comprises mating coupling members, one of which forms a driven coupling member supported by the spool and the other forms a driving coupling member supported by a gear which is rotatable by a crank. According to the preferred embodiment, the spool of the reel is, together with its coupling member, rotatably journaled in the spinning reel independent of the unit which comprises the driving coupling member and guide means, and this unit is, in the disengagement position of the driving coupling member, supported completely free from contact in relation to the spool and to elements connected to the spool, with the driving coupling member axially directed for shifting to the engagement position.

22 Claims, 5 Drawing Figures

COUPLING MECHANISM WITH MEANS FOR DISENGAGEMENT AND FOR AUTOMATIC ENGAGEMENT OF THE SPOOL IN SPINNING REELS

The present invention relates to a coupling mechanism with means for disengagement and automatic engagement of the spool in spinning reels.

It is previously known to provide spinning reels with a coupling mechanism which permits disengagement of the spool from the crank and automatically couples together the spool and the crank when the crank is rotated for winding up of the line onto the spool. In a prior art mechanism of this type the spool is driven from the crank by the intermediary of a device rotatable by means of the crank and axially shiftable into and out of engagement with the spool. This rotatable device is normally a gear wheel which is mounted rotatably and axially shiftable and to which is fixed a coupling member. When the gear wheel is moved in the direction of the spool, this coupling member will be moved into engagement with a mating coupling member supported by the shaft of the spool. On disengagement, the axially movable part consisting of the gear wheel and its associated coupling member will be moved in a direction from the spool to a position in which the coupling members are disengaged so that the spool is freely rotatable in relation to the crank transmission. However, the construction necessitates the provision of means for mounting and guiding the axially movable gear wheel and the coupling member associated therewith in order that, on re-enagement, the latter will be moved into proper engagement with the mating coupling member on the shaft of the spool. Because, among other factors, of the restricted available space, this problem has been solved in the prior art construction such that the rotatable and axially movable part (i.e. the gear and its coupling member), by being guided on the shaft of the spool, will also retain a certain sliding engagement with the spool in the disengagement position, this entailing a certain sliding friction. This sliding friction affects the length of the cast and can moreover give rise to vibration of the gear wheel, vibration which in turn may have a detrimental effect on the rotation of the spool during a cast.

There is also known a coupling mechanism, in which the spool is rotatably mounted on stub shafts at its ends. One of these stub shafts forms a guide for a movable part consisting of a gear wheel and a coupling member. A serious drawback is that this mechanism needs a bearing between the spool and the end of the stub shaft and that this stub shaft end forms an inner race for the bearing. Such inner race, bearing and the support for the stub shaft in the reel will, because of the small space available, be of small dimensions and will give rise to instability and increased drag (resistance) in the free rotation of the spool.

The major aspect of the present invention is to provide a coupling mechanism in which the spool is steadily mounted for easy running and is completely free from the driving coupling member in the disengagement position, so that, during a cast, it can rotate freely without any disturbance. According to the invention, the spool of the coupling mechanism is, together with its coupling member, rotatably journaled in the spinning reel independent of the unit comprising the driving coupling member and the guide means, and the unit is, in the disengagement position, of the driving coupling member, supported completely free from contact in relation to the spool and to elements connected to the spool, with the driving coupling member, axially directed for shifting to the engagement position.

Another aspect of the present invention is to provide a coupling mechanism which has fewer separate parts than do prior art coupling mechanisms of similar type, so as thereby to reduce to a minimum manufacturing, assembly and maintenance costs.

The invention will be described in greater detail hereinbelow with reference to the accompanying drawings, in which.

Figure 3:
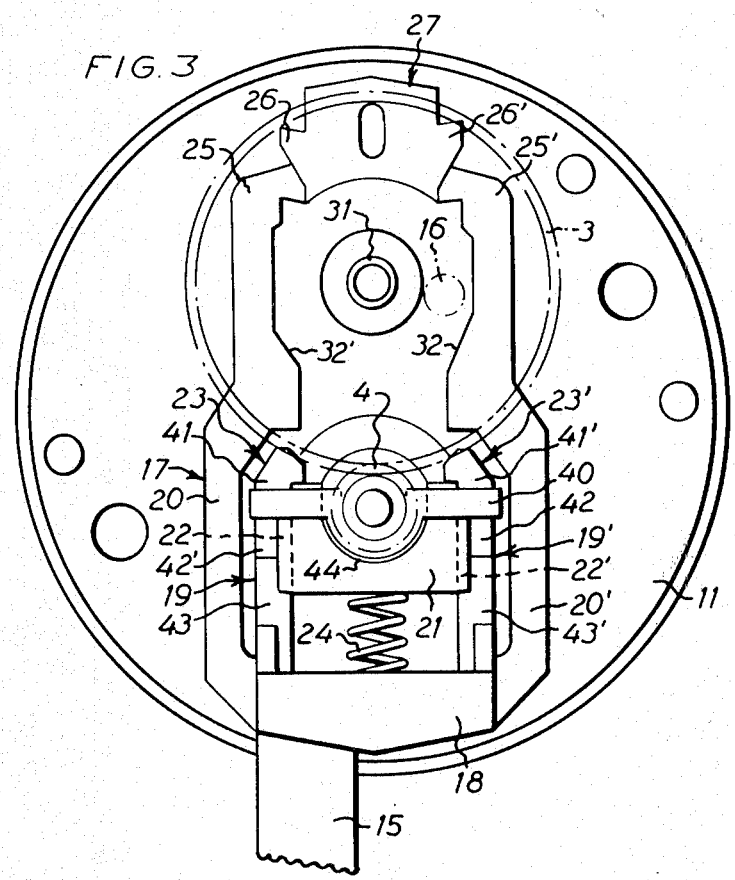
Figure 4:
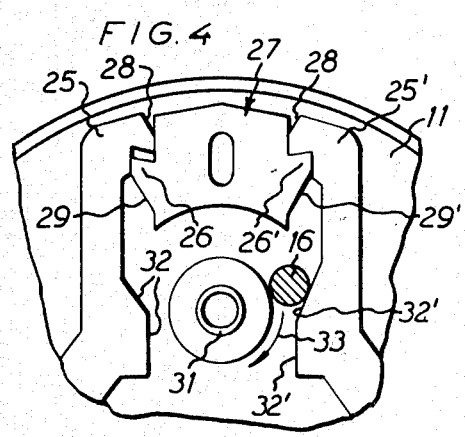
Figure 5:
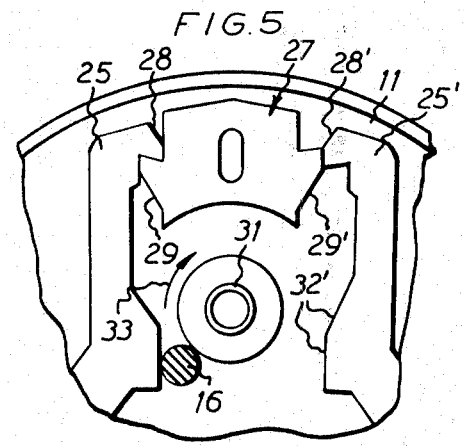

FIG. 3 is a side elevation of the inner end plate of the coupling and gear housing and the portion of the coupling mechanism mounted on the end plate seen in the direction towards the line spool and with the latching arms in the free position, corresponding to the engaged position of the spool; and FIGS. 4 and 5 show the latching arms in two different locking positions, both corresponding to the disengagement position of the spool.

Figure 1:
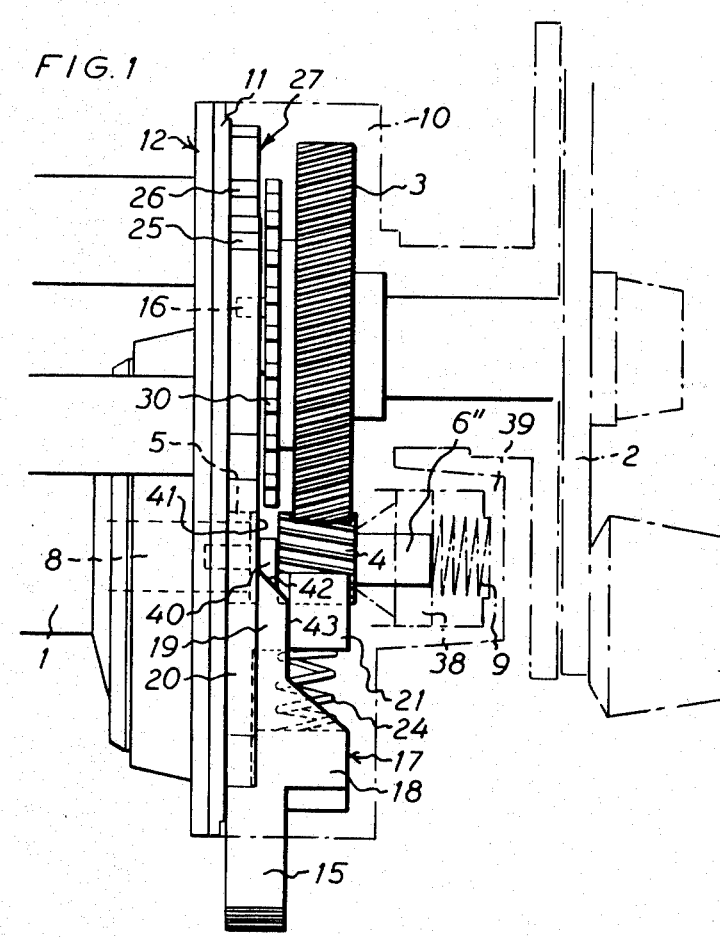
FIG. 1 is an axial cross-section of the coupling and gear housing in a spinning reel provided with a coupling mechanism according to the invention, and shows the coupling in the engagement position.
Figure 2:
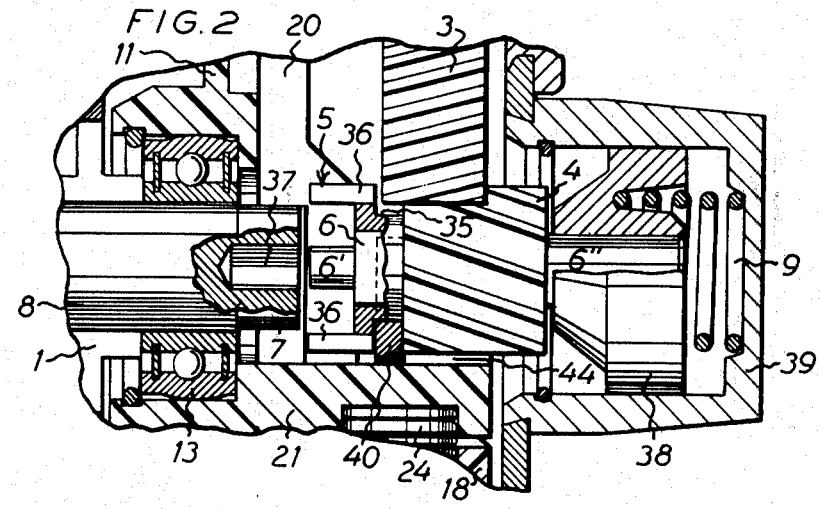
FIG. 2 shows a portion of the coupling of FIG. 1, on a larger scale and in more detail and in the disengagement position.

Those parts of the spinning reel in FIGS. 1 and 2 which are of primary interest in the following description of the coupling mechanism are the line spool 1, the crank 2 and the transmission between the crank and the spool. As is previously known, this transmission can include a gear wheel 3 driven by the crank by the intermediary of a friction coupling (not shown), a gear wheel 4 driven by the gear wheel 3 and a coupling member 5 on one end of a shaft 6 on which is fixed the gear wheel 4. In the embodiment here described and illustrated in the drawings, the parts 4, 5 and 6 form a unit which is rotatable by means of the crank and is axially shiftable for transforming the coupling member 5 into and out of engagement with a corresponding coupling member 7 at the adjacent end of the shaft 8 of the line spool 1. The unit 4, 5, 6 is biased, by means of a spring 9, in a direction towards the engagement position of the coupling 5, 7. The gear housing is formed of an outer casing 10 and an inner end plate 11, these parts being releasably fixed on the frame 12 of the reel. In the region of the coupling 5, 7, the shaft 8 of the spool 1 is journaled in a bearing 13 in the plate 11.

Like, for example, the coupling mechanism disclosed in the coupling mechanism according to the present invention is arranged for manual disengagement of the spool from the crank transmission by means of a disengagement arm 15 which is placed for easy access on the outer side of the coupling and gear housing and is disposed for automatic re-engagement of the spool by the action of a member 16 driven by the crank transmission as the crank is rotated for commencing the winding up of the line on the spool. Thus, the coupling mechanism according to the present invention agrees in principle with prior art coupling mechanisms for the disengagement and re-engagement of the spool, but differs from the prior art coupling mechanisms partly by an improved disengagement position and partly by a simpler and functionally more reliable construction, this being apparent from the following description.

As shown in FIG. 3, the disengagement arm 15 is connected, preferably in one continuous piece, with a latching and operating device 17 for the coupling. The latching and operating device 17 is in the form of a fork or yoke 18 with two inner guide prongs 19, 19' and two other latching prongs 20, 20'. The inner guide prongs 19, 19', which also form the operating prongs for the coupling, straddle a holder which is connected to the inner end plate 11 and is in the form of a block 21 projecting from that side of the end plate 11 which faces away from the spool 1. The guide prongs 19, 19' are shiftably guided in guide grooves 22, 22' in the side edges of the block 21. The parts 15, 17 form a unit which rests with a planar rear face on the side of the plate 11 facing away from the spool 1 and which is reciprocal between an inner and an outer stop position which, in the one direction, is determined by abutment of the fork 18 against one side of the block 21, and, in the other direction, by abutment of projections 23, 23' at the ends of the guide prongs 19, 19' against the opposite side of the block 21. The units 15, 17 is held in place on the block 21 by means of the described guiding and abutments. A spring 24 is lodged between the block 21 and the fork 18 and tends to bias the unit 15, 17 radially in a direction outwardly to a position which corresponds to the engagement position of the spool.

The latching prongs 20, 20' are provided with claws 25, 25' at their ends for cooperation with hooks 26, 26' on a latching boss 27 fixed on the plate 11.

In the construction according to the present invention, the latching prongs 20, 20' are resilient and the latching prong claws 25, 25' are provided with cam surfaces 28, 28' (see FIGS. 4 and 5) in order to realize, in cooperation with corresponding cam surfaces 29, 29' on the hooks 26, 26' of the latching boss, separation of the prongs 20, 20' on depression of the disengagement arm 15. When the claws 25, 25' on the latching prongs 20, 20' have passed the hooks 26, 26' on the latching boss, they snap into latching engagement with these by virtue of the inherent resilience of the latching prongs.

The part 16 driven by the crank for disengagement of the latching prongs and triggering of the automatic engagement of the spool consists of a pin on a wheel driven by the crank 2, for example, a latching wheel 30 coupled together with the gear wheel 3 (shown only in FIG. 1) which, together with a latching hook (not shown) prevents rotation of the crank 2 in the wrong direction. When the crank is rotated, the pin 16 moves in a circular path about the shaft 31 of the gear wheel 3 between the latching prongs 20, 20'. The inner edges of the latching prongs are provided with cam surfaces 32, 32' on projections, these cam surfaces being, in the engagement position (FIG. 3) of the coupling, located radially beyond the path of movement of the pin 16, as a result of which the crank, in the engagement position of the spool, can be rotated without having any effect on the latching prongs 20, 20' and without having any effect on the coupling whatsoever. On the other hand, in the disengagement position (FIGS. 4 and 5) of the coupling, the cam surfaces 32, 32' on the projections are located in the path of movement of the pin 16. The prongs 20, 20' are arranged each to hold the unit 15, 17 fixedly hooked and latched, this, as is shown by way of example, being achieved such that the claw 25 on the prong 20 in the disengagement position (FIG. 4) holds the unit 15, 17 hooked and latched by means of engagement with the hook 26, and such that the claw 25' on the other prong 20' is simultaneously located a short distance from the hook 26' but in a position for engagement with the hook, if the claw 25 becomes disengaged from the hook 26.

It is supposed that the pin 16 is located in the initial position shown in FIG. 4, and is moved in the direction intimated by the arrow 33 when the crank is rotated for engagement of the spool and for winding up of the line. The pin 16 will then, by pressure against the cam surface 32 on the prong 20 move aside the prong 20 from the latching boss 27, the spring 24 shifting the unit 15, 17 radially outwardly, but this movement being stopped in that the claw 25' on the prong 20' (which can, for example, be longer than the prong 20) is caught by the corresponding hook 26'. The position shown in FIG. 5 has then been reached and in this position the spool is still disengaged. In the continued movement of the pin 16 it is shifted into engagement with the cam surface on the projection 32' and there forces to one prong 20' outwardly so that the claw 25' is moved aside from the hook 26'. The unit 15, 17 is, in this position, moved by the spring 24 to the position shown in FIG. 3 which corresponds to the engagement position of the spool. If the pin 16, in an initial position for the automatic engagement of the spool, first comes into contact with the projection 32' on the prong 20', the prong 20' will certainly be moved aside, but, in view of the fact that the other prong 20 will not be affected, the claw 25 retains its engagement with the hook 26 and the only thing that happens is that the prong 20' springs back to the position in FIG. 4 when the pin 16 once again leaves this prong 20'. When the pin 16 then continues along its path, the above-described disengagement of the latching prongs will take place as well as the shifting of the unit 15, 17 to the engagement position of the spool.

The above-described arrangement of two latching prongs fills the function (known in spool disengagement mechanisms) of making the disengagement of the spool independent of the position of the crank at the time of the disengagement. If the pin 16 is located opposite a latching 20, 20', the other latching prong can always be brought into engagement with the latching boss 27. If it is desired to dispense with this function, a single latching prong is sufficient.

As was mentioned above, the guide prongs 19, 19' form operating members for the coupling member 5 on the shaft 6. The coupling member 5 consists of one end portion of the narrow gear wheel 4, this portion being demarcated from the gear wheel proper by means of an annular groove 35 and having a forked end formed by a slot-like recess, the end having two axially directed shanks 36 with planar inner sides for engagement with two planar diametrical surfaces on the end portion of the spool shaft 8. The end of the spool shaft 8 is provided with a bore 37 which forms a guide for a tapering end portion 6' of the gear wheel shaft 6. The gear wheel shaft 6 is, by means of an end portion 6" projecting from the opposite side of the gear wheel, journaled in a bearing 38 which, in its turn, is shiftably journaled in a bearing box 39 mounted on the outer end wall of the coupling and gear housing. The spring 9 is tensioned between the bearing box 39 and the bearing 38 and acts on the gear wheel 4 and its shaft 6 by the intermediary of the bearing 38. A circularly bent central portion of a carrier plate 40 engages in the annular groove 35 on the gear wheel 4, the straight ends projecting from the bent portion of the carrier plate resting on the guide prongs 19, 19'. In the engagement position of the coupling, the carrier plate 40 rests on planar surfces 41, 41' on the end portions 23, 23' of the guide prongs, and in association with these planar surfaces, the guide prongs each have a sloping ramp surface 42 and 42', respectively which extend at an angle to second planar surfaces 43 and 43', respectively on each guide prong near the fork 18. The planar surfaces 41, 41' and 43, 43'thus lie on two differential axial levels (see FIG. 1). When the disengagement arm 15 is depressed, the guide prongs 19, 19'slide towards the carrier plate 40 which, guided in a circular recess 44 in the block 21, is shifted axially outwardly in a direction away from the spool 1 and thereby moves the unit consisting of the coupling member 5, the gear wheel 4 and its shaft 6 in an axial direction against the action of the spring 9, the spring being compressed in order, at the re-engagement moment, to re-shift the unit 4, 5, 6 to the engagement position. In this axial outward movement of the unit 4, 5, 6, the coupling mmember 5 is moved out of engagement with the coupling portion 7 on the shaft 8 of the spool. The gear wheel 4 is at all times in engagement with the gear wheel 3. The guide pin 6' of the gear wheel shaft 6 is, in the illustrated embodiment, of the same axial length as the shanks 36 of the coupling member 5 and leaves the coupling member 7 simultaneously with the shanks 36. In the disengagement position, the spool 1 is totally free from the gear wheel 4 which is held in constant engagement with the gear wheel 3 in that it is supported at both ends (because of the journaling of the shaft pin 6" in the bearing 38 and because of the engagement of the carrier plate 40 in the annular groove 35), thereby avoiding any tendency to vibration of the gear wheel 4, which can arise in prior art coupling mechanisms of this type when the spool is disengged during the cast phase and also subsequently during the rotation of the spool 1 as the line is paid out. As a result, one reason for friction and functional disturbances is eliminated.

In the preferred embodiment of the coupling mechanism according to the invention shown on the drawings, the disengagement arm 15 the latching prongs 20, 20' and the operating and guide prongs 19, 19' are integrated in a single continuous piece. Consequently, the requisite number of springs in the entire mechanism is restricted to the coupling return spring 9 and the return spring 24 for the latching and operating unit 15, 17, not including the fact that the latching prongs 20, 20' themselves form springs for the requisite separation during the movement to latching engagement and for the snap-action for engagement with the hooks 26, 26' on the latching boss 27. Thus, the number of separate movable parts and springs is restricted to a minimum.

The above-described preferred embodiment may be modified in a number of ways within the spirit and scope of the appended claims. For exammple, the coupling members 5, 7 may be of a different design and the coupling member 5 may be connected to a transmission element other than the gear wheel 4. Moreover, the unit consisting of the disengagement arm 15 and the latching and coupling member 17 can be composed of several parts. Such a design will also provide the essential advantages of the described construction in relation to prior art coupling mechanisms which were described by way of introduction.

What I claim and desire to secure by Letters Patent is:

1. Coupling mechanism in a spinning reel for manual disengagement and automatic engagement of the reel, said mechanism including a coupling member connected to said spool and a unit of assembled parts consisting of a driving coupling member rotatable by means of a crank and a guide means for rotatable and axially shiftable mounting of said driving coupling member which normally enmeshes in driving engagement with the coupling member of said spool and is switchable by means of a manually actuable operating device from this driving engagement by shifting in a direction from said spool against the action of a return spring to a disengagement position in which it is retained by means of a latching device which is releasable by the rotation of said crank for triggering of an automatic re-engagement operation realized by means of said return spring, wherein said spool is, together with its coupling member rotatably journaled in said spinning reel independent of said unit comprising said driving coupling member and said guide means, and wherein said unit is, in the disengagement position of said driving coupling member, supported completely free from contact in relation to the spool and to elements connected to the spool, with said driving coupling member axially directed for shifting to the engagement position.

2. Coupling mechanism as claimed in claim 1, wherein said shifatable coupling member is connected with a shaft which is coaxial with the shaft of said spool and, with one end portion directed away from said spool, is journaled in cantilever fashion by bearing means arranged to permit said shifting movement of said shiftable coupling member between said engagement and disengagement positions and forming a guide for this movement.

3. Coupling mechanism as claimed in claim 2, wherein said shaft coaxial with the shift of said spool, supported, in a per se known manner, a gear wheel included in the crank transmission, which gear wheel is connected to said shiftable coupling member, or with which gear wheel shiftable coupling member is integrally formed.

4. Coupling mechanism as claimed in claim 3, wherein said bearing means includes a bearing axially shiftable in a stationary guide.

5. Coupling mechanism as claimed in claim 4, wherein said return spring is loaded between said shiftable bearing and a fixed portion.

6. Coupling mechanism as claimed in claim 5, wherein the guide for said shiftable bearing consists of a casing connected to the frame of the reel.

7. Coupling mechanism as claimed in claim 1, wherein said shiftable coupling member or its supporting shaft, coaxial with the shaft of said spool, has guide pin directed towards the coupling member of said spool, and wherein the coupling member of said spool has an axial bore opening towards said guide pin and arranged to accommodate and thereafter guide said guide pin upon shifting of said shiftable coupling member to the engagement position.

8. Coupling mechanism as claimed in claim 7, wherein a carrier member which is included in said operating device and is disposed, on actuation of said operating device, to shift said shiftable coupling member to the disengagement position, forms a support bearing for said member.

9. Coupling mechanism as claimed in claim 8, wherein said carrier element is in the form of a plate with a circularly bent central portion and two straight end portions, and wherein said circular central portion engages in an annular groove on said shiftable coupling member or in a gear wheel which forms part of said crank mechanism and is fixed to that shaft by means of which said movable coupling member is supported, said movable coupling member being preferably provided, in a per se known manner, on that end of said gear wheel which faces said spool.

10. Coupling mechanism as claimed in claim 1, in which the latching member actuable by means of the crank of said reel is disposed, to maintain in a latching position, a manually actuable disengagement arm in the disengagement position by engagement with an abutment, wherein said latching member displays at least one latching prong which is shiftable by means of said disengagement arm in a substantially straight path of movement into engagement with an abutment supported on a portion of said spinning reel, and is arranged, on pressure against said abutment, to be pivoted or bent aside against the action of a spring to permit further shifting relative to said abutment to a position in which said abutment permits said latching prong to spring back into latching position relative to said abutment.

11. Coupling mechanism as claimed in claim 10, in which said latching prong supported by said latching member may be moved aside by the influence of the crank of said spinning reel from corresponding latching abutments for triggering the return movement of said disengagement arm and said movable coupling member, by means of said return spring, to said enagement position, wherein said disengagement arm and said latching member are disposed as a jointly movable unit and wherein said latching abutment is supported on a portion connected to said spinning reel.

12. Coupling mechanism as claimed in claim 11, having a latching member to permit latching, of said disengagement operating arm in the disengagement position, independent of the position of said crank on disengagement, said latching member having two latching prongs disposed each to hold said disengagement arm in said disengagement position by engagement each with a latching abutment, wherein both of said latching prongs and corresponding abutments are disposed relative to each other such that first one and then the other of said latching prongs is brought into engagement with its respective latching abutment in that the movement distances of the latching prongs to their respective latching abutments are different in length.

13. Coupling mechanism as claimed in claim 12, wherein said latching prong or each of said latching prongs is resiliently bendable, and wherein said spring force is the spring force which is developed by the prong proper as it is resiliently bent aside by pressure against said abutment.

14. Coupling mechanism as claimed in claim 13, wherein said disengagement arm, said latching member and its latching prong or prongs form an integral unit.

15. Coupling mechanism as claimed in claim 14, whrein said disengagement arm and both latching prongs of said latching member are united to form an integral unit by the intermediary of an interposed fork from which said disengagement arm extends in one direction and said latching prongs extend in the opposite direction, parallel to and spaced apart from each other, and wherein said fork supports two spaced parallel guide prongs which are located between said latching prongs, straddle a block fixed to a plate connected to said spinning reel and engage in parallel guide grooves in said block, said disengagement arm, said fork and said guide and latching prongs forming an operating unit which is held in place and guided on said block by means of said guide prongs and said guide grooves for shifting movement between limits determined by, on the one hand, abutment between said block and said fork, and, on the other hand, by abutment between said fork and projections at the free ends of said guide prongs.

16. Coupling mechanism as claimed in claim 15, wherein said guide prongs are in the form of rails which engage with edge portions in said guide grooves and display side surfaces serving as cam surfaces for axial shifting of said coupling member to a position corresponding to the disengagement position of said spool, out of engagement with said coupling member on said spool shaft, on shifting of said disengagement arm to the disengagement position.

17. Coupling mechanism as claimed in claim 16, wherein said carrier element coupled together with said shiftable coupling member is guided by means of said block for movement parallel to the common longitudinal axis of said spool and said coupling members, and rests, with portions directed at right angles relative to said spool shaft, on the sides of said guide prongs provided with cam surfaces, by means of which said carrier element, as it slides on said cam surfaces, is shifted in a direction from said coupling member on said spool shaft on disengagement of said spool, while said shiftable coupling member is shifted, in a per se known manner, in the opposite direction by means of said return spring at the automatic engagement of said spool triggered by said crank, said carrier element, during said return movement together with said coupling member, sliding on said cam surfaces at the simultaneous return movement of the unit comprising said disengagement arm, said guide prongs and said latching prongs.

18. Coupling mechanism as claimed in claim 17, wherein a return spring for the operating unit consisting of said disengagement arm, said guide prongs and said latching prongs is lodged between said block and said fork.

19. Coupling mechanism as claimed in claim 17, in which said movable coupling member is supported by means of an axially shiftable shaft, wherein said shaft with its end portion distal from said coupling member is journaled in a guide bearing which is axially shiftable in a guide and is disposed to be shifted together with said shaft at engagement and disengagement of said coupling member, and wherein the return spring for said coupling member is a spring lodged in said guide between said guide bearing and a fixed or adjustable portion, said spring, because of its action on said guide bearing and said coupling member, also acting upon said carrier element and tending to hold said carrier element in abutment against said cam surfaces.

20. Coupling mechanism as claimed in claim 15, wherein said block is connected to a plate provided as an inner wall of the coupling and gear housing of said spinning reel, and wherein said operating unit is shiftably supported by said plate on its side facing said plate.

21. Coupling mechanism as claimed in claim 20, wherein said latching abutments which are preferably provided on one and the same portion, are fixedly mounted on said plate.

22. Coupling mechanism as claimed in claim 15, wherein said unit is formed as a continuous piece of plastic.

* * * * *